Dec. 29, 1964  L. R. IVEY  3,163,149
MOBILE WASHER FOR LABORATORY ANIMAL CAGES
Filed March 4, 1963
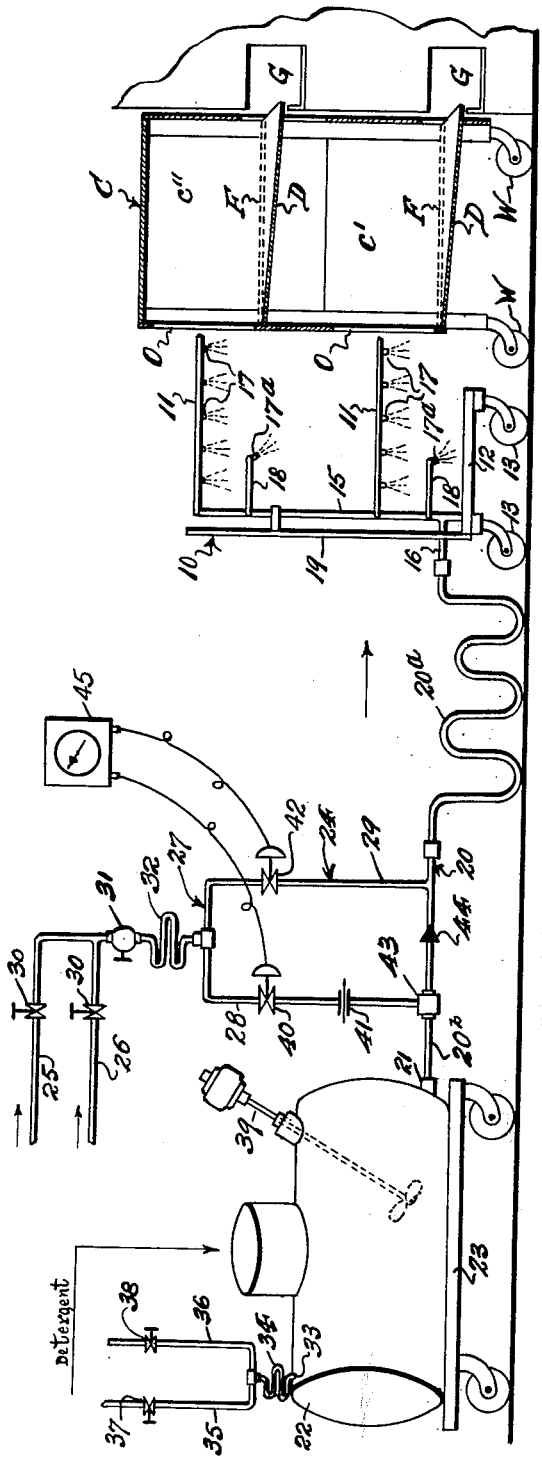
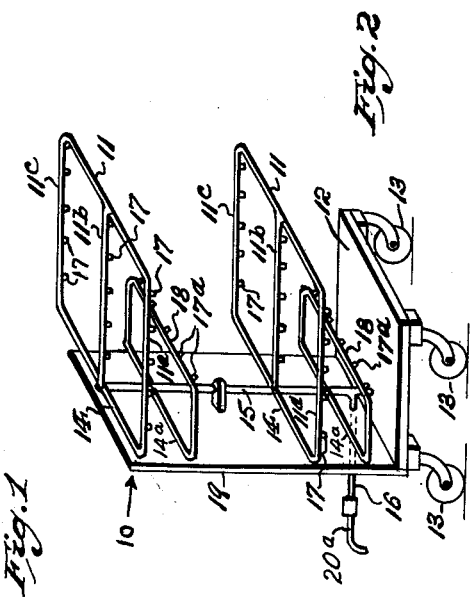
INVENTOR.
Lee R. Ivey,
BY
Dudley B. Howard
Attorney

United States Patent Office 3,163,149
Patented Dec. 29, 1964

3,163,149
MOBILE WASHER FOR LABORATORY
ANIMAL CAGES
Lee R. Ivey, 11 Dehart St., Morristown, N.J.
Filed Mar. 4, 1963, Ser. No. 262,539
5 Claims. (Cl. 119—15)

This invention relates in general to the equipment provided in medical research laboratories for use in cleansing the animal cages, and has particular reference to cleansing equipment adapted to service cages for animals of the larger species, such as dogs, which cages may be of the construction disclosed in my co-pending application Serial Number 228,076, filed October 3, 1962 now Patent No. 3,098,465, covering a large double-decker "Dog Cage" having animal-supporting gratings and underlying drainage pans that are inclined rearwardly to facilitate sluicing of excrement into registering wall gutters.

Until a relatively few years ago, most laboratory animal cages were washed inside by hand or hand-directed water or steam hoses, but, within the last ten or fifteen years, there have been available on the market washing machines into which the cages may be rolled or placed by hand, and in most of these machines there have been incorporated time control devices to regulate the application of hot detergent solution and rinse water to each inserted cage alternately through jets with enough pressure to remove all accumulated solids and liquids from its exposed surfaces. Much more effective cleaning than the previously practiced hand-directed hosing is achieved and at a considerable saving in manpower.

However, some laboratory supervisors are concerned because, although the manpower is less than that required for hand-directing hosing, it is more than offset by the manpower extended in transferring the great number of cages to and from the central washing area in which the washing machine is located. This is particularly true when the cages are large double-deckers. This leads, in laboratories that have cage washing machines, to some hand washing on a "partial clean-up" basis in between trips to the machine. For example, each cage may be taken to the washing machine once or twice a week for thorough cleaning, but, every day and sometimes more often than that, an attendant removes the grating floor on which the dog stands and the pan beneath it and washes these parts in a sink in the animal room, or a number of them from several cages are placed on a special rack and taken to the washing machine. This is an undesirable practice, but results naturally from the inconvenience and labor of moving complete cages back and forth.

There are even more disadvantages in the use of central washing machines. For instance, a washing machine which can enclose a dog cage of the larger double-decker models, is very large and space-consuming. It also requires extensive sewerage facilities in addition to those already installed in connection with the cages in the animal room. Then, too, the washing machine uses excessive quantities of detergent and water because the already clean exterior surfaces of each enclosed cage under treatment are exposed to the spray jets.

With the above-enumerated disadvantages of the prior art cage washing equipment in mind, it is the primary object of the present invention to provide a mobile washing spray header unit of simple and light construction adapted to be hand propelled from cage-to-cage, and which can be used to apply hot fluid, such as water and detergent solution, to the fouled interior surfaces only of each cage in such a manner that deposited solids and liquids will be sluiced into the customary wall drain troughs. Cleansing fluid is supplied to the mobile header unit by a flexible hose leading from a centrally located supply controlling source.

A further object is to provide time-controlled means adapted to be set in a predetermined manner such that it will deliver alternately water alone and detergent solution to the mobile header unit in a cycle of sequential operations capable of mechanically loosening deposited solids under high pressure, then soaking any matter that fails to respond to pressure with detergent, and finally rinsing with a blast of hot water.

Still further advantages, objects and features of my invention will become apparent as the following specific description is read in connection with the accompanying drawings, in which:

FIG. 1 is a diagrammatic side elevational view of the complete cage washing apparatus in use with a double-decker dog cage; and FIG. 2 is perspective view of the mobile washing spray header vehicle alone.

Referring now in detail to the drawings, wherein like reference characters designate corresponding parts in the several views, FIG. 1 includes schematic representation of the "Dog Cage" covered by my co-pending application Ser. No. 228,076, filed October 3, 1962. This cage C is a double-decker comprising a bottom cage $c'$ and a top cage $c''$. The complete unit C is mounted on wheels W so that it can be moved toward or away from the wall troughs or gutters G of the animal room. It is customary to have a long row of side-by-side cages C backed up against each wall with their respective drainage pans D in registration with gutters G. Drainage pans D closely underlie floor gratings F on which the caged laboratory animals stand or lie. The lower and upper cages $c'$ and $c''$ have front door openings O for access to the animals and to permit introduction of cleansing means.

In accordance with my present invention it is proposed to leave the cages C in their permanent positions in rows backed up against the wall gutters G, and to replace hand-hosing of the interior floor gratings F and drainage pans D or movement of the individual cages to and from a central washing machine by employment of a mobile washing spray header vehicle 10, which may be moved from cage to cage and is equipped with performate horizontal tubular arms 11 arranged for horizontal registration with the respective door openings O, or any equivalent openings, of cage C.

Referring particularly to FIG. 2, which shows the washing spray header vehicle 10 in greater detail than in FIG. 1 although still schematic, this vehicle includes a base 12 which is low and narrow enough to permit it to be rolled on its supporting wheels 13 beneath the bottom of lower cage $c'$.

It being practicable to construct the entire header carriage of tubular stock, each tubular arm 11 is shown in the form of a horizontally flat grill having preferably three parallel branches 11a, 11b and 11c communicatively connected with a transverse header pipe 14 that is supported at an appropriate level by a vertical tubular column 15, which is rigid with base 12. The lower end of column 15 is sealed off, but a hose connection 16 is communicatively connected thereto a short distance above said end. The branches of tubular arm 11 have downwardly directed spray nozzles 17 in communication with perforations in said arms. By arranging arms 11—11 to overlie the floor gratings F of the respective cages $c'$ and $c''$, spray nozzles 17 will cause fluid jets to impinge against those surfaces of the said gratings and underlying drainage pans D that usually become soiled.

In addition to the comparatively extensive tubular arms 11—11, which are located at levels calculated to overlie the respective floor gratings F—F, there are comparatively short auxiliary tubular arms 18—18 positioned at lower levels to overlie the respective drainage pans D—D. The nozzles 17a—17a of these auxiliary arms 18—18 are directed obliquely rearwardly and downwardly for more effective sluicing action rearwardly toward the wall gutters G—G. Auxiliary arms 18—18 are in communication with tubular column 15 through header pipes 14a—14a.

In order to prevent cleansing fluid from splashing out of the rear portion of cage C when the doors are open for introduction of tubular arms 11—11 and 18—18, a splash board 19 arranged in a vertical transverse plane and at least equal in area to the door openings is affixed to vertical tubular column 15 and transverse header pipes 14—14 and 14a—14a.

A source of supply of cleansing fluid for mobile washing spray header carriage 10 is located at a convenient distance from the row, or rows, of wall-lining cages C and includes a delivery pipe 20, which extends horizontally and comprises a flexible hose section 20a terminally connected to hose connection 16 of said header carriage and a rigid section 20b located more remote from the latter. The length of flexible hose section 20a should be such that it will reach from a base position substantially in the center of the animal room to washing spray header vehicle 10 throughout its travel from cage to cage.

Delivery pipe 20 has the upstream end of its rigid section 20b connected directly to the outlet 21 of a detergent tank 22 of limited mobility that is mounted on a wheeled dolly 23. Delivery pipe 20 is also connected through fluid flow controlling means 24 with a source of supply of hot and cold water such as the hot water service pipe 25 and cold water service pipe 26 of the laboratory water supply system.

Before describing the water supply source in detail, it will be explained that fluid flow controlling means 24 includes a tubular fluid flow distributing element 27 of substantially inverted U-shape, which has depending first and second side brances 28 and 29, respectively, connected communicatively with the rigid section 20b of delivery pipe 20.

In order to permit precise regulation of the temperature of the water supplied to flow distributing element 27, manual control valves 30—30 are provided in hot and cold water service pipes 25 and 26. Downstreamward of service valves 30—30, service pipes 25 and 26 are connected through a common large area pressure control valve 31 by a first junction pipe 32 having an outlet end connected communicatively to the fluid flow distributing element 27 medially with respect to the respective first and second side branches 28 and 29.

At this point in the description it should be stated that fluid flow distributing element 27 and its accessory parts, to be described in detail presently, are supported in integral relation to delivery pipe 20 by detergent tank 22. Consequently, in order to permit a sufficient degree of mobility for detergent tank 22 and its supporting dolly 23, first junction pipe 32 should be flexible wholly or in part, as shown. Similarly and for the same purpose, detergent tank 22 has its inlet 33 connected communicatively to the downstream end of a flexible second junction pipe 34 connected in turn to hot and cold water service pipes 35 and 36, respectively, downstreamward of manual control valves 37 and 38 provided to permit regulation of the temperature and quantity of water admitted to said tank. Conventional mixing means 39 is operatively associated with detergent tank.

Further details of flow controlling means 24 will now be described. A first automatic control valve 40 is provided in first branch 28 of fluid flow distributing element 27, and said branch is provided downstreamward of valve 40 with a small area orifice controlling device 41. A second automatic control valve 42 is provided in second branch 29 of fluid flow distributing element 27. Both first and second automatic control valves are adapted to be operated all the way between shut and open positions by timer means to be described more fully later herein. Consequently, when second automatic control valve 42 is open, the rate of flow and pressure of water therethrough into delivery pipe 20 will be determined by the setting of large area orifice control valve 31 in first junction pipe 32. Incidentally, to prevent unauthorized tampering with valve 31, its stem may be severed to remove the handwheel. When first automatic control valve 40 is open, small area orifice controlling device 41 will prevail over large area orifice valve 31.

At the junction of first branch 28 of fluid flow distributing element 27 with the rigid section 20b of delivery pipe 20, a siphon 43 is provided to siphon detergent solution from detergent tank 22 into said delivery pipe under the influence of flow of water through said first branch 28. A check valve 44 is provided in rigid section 20b of delivery pipe 20 intermediate of side branches 28 and 29 of fluid flow distributing element 27 to prevent reverse flow in said rigid delivery pipe section of water descending in side branch 29.

To complete the flow controlling means of my invention, I have introduced a time control device 45 (preferably electrical) such as may be obtained on the market, to operate first and second automatic control valves 40 and 42, respectively, in accordance with any desired sequence of control operations in the cycle thereof required for the cleansing of each cage C. A timer of the required type is adapted, when its control switch is set at "ON" position, to start the sequential operations and to continue them to the end of the predetermined cycle, at which time the switch will automatically be restored to "OFF" position.

A typical cycle of operations comprises: (1) opening second automatic control valve 42 for a comparatively long period of time to deliver a high pressure blast of hot water to washing spray header 10; (2) opening first automatic control valve 40 for a comparatively short period of time to deliver detergent solution at low pressure and soften any excrement still adhering to the soiled parts of cage C; and (3), after a brief pause, opening second automatic control valve 42 for a short period to produce a hard blast of water alone for rinsing purposes.

*Operation*

Detergent tank 22, whose capacity will be limited by the force required to move it around on its dolly 23 (probably 50 gallons minimum), is charged with a mixture of hot and cold water. Then an appropriate proportion of detergent is scooped in, and a strong solution or slurry is made by stirring with mixer 39. If this servicing of the detergent tank was performed in a room other than the animal room, the supporting dolly 23 is now rolled into the animal room and has its inlet 33 connected to second junction pipe 34 of the service pipe line in that room. First junction pipe 32 is connected to hot and cold water service pipes 25 and 26 in the animal room and flexible section 20a of delivery pipe 20 is connected to hose connection 16 of washing spray header carriage 10.

At this time, it may be mentioned that large orifice area pressure valve 31 should be adjusted manually to fix the water supply pressure at approximately 40 p.s.i., whereas orifice controlling device 41 has a permanent setting of 20 p.s.i.

The apparatus is now ready for operation, so the doors of the first cage C to be washed (probably at one end of a row) are opened and mobile washing spray header vehicle 10 is rolled into position with tubular arms 11—11 penetrating the interior of lower and upper cages c' and c'' and splash board 19 closing the door openings. All that is now required is to throw the switch of timer 45 into the "ON" position, whereupon a complete cycle of sequential cage cleansing operations will be performed automatically, as previously described. When the timer switch has become re-set automatically at the "OFF" position, mobile washing spray header vehicle 10 may be rolled into operative position in front of the next cage to be washed and timer 45 may be turned "ON" again.

While the invention has been illustrated and described with respect to a particular embodiment thereof, it will be understood that it is intended to cover all changes and modifications of the embodiment shown which do not constitute departures from the spirit of the invention and scope of the appended claims.

I claim:
1. In combination:
an animal cage comprising a plurality of compartments arranged successively in a vertical direction;
a front side of each compartment containing an access opening;
a rear side of each compartment containing a drainage opening;
a bottom portion of each compartment comprising a grating and a drainage pan beneath the grating which slopes from the front side to the drainage opening;
means for supporting the animal cage and for displacing it a predetermined distance from the surface upon which it rests;
means for cleaning said compartments comprising a mobile washing vehicle;
said vehicle comprising a horizontal platform and a vertical main fluid pipe;
a plurality of branch pipes each extending horizontally from said vertical main pipe a distance which is substantially equal to the horizontal length of each of the compartments;
a plurality of nozzles on each of the branch pipes, each of which is directed in a downward vertical direction;
a plurality of wheels mounted on the bottom of the platform;
the total vertical length of said wheels and platform being smaller than the said displacement of the animal cage, thereby permitting the platform to be moved beneath the animal cage;
the branch pipes being mounted at vertical positions corresponding to the vertical positions of the access openings in said compartments, and extending in the same horizontal direction as the platform, whereby said branch pipes are adapted to extend simultaneously along the lengths of said compartments;
means for transmitting cleaning fluid to said branch pipes by way of a flexible hose connected to said main pipe; and
means for transmitting cleaning fluid from the drainage openings of each of the compartments.

2. The combination of claim 1 further comprising:
means for shielding the region in front of the animal cage from cleaning fluid ejected from the nozzles of the branch pipes and for supporting the main pipe comprising a vertical flat splash board mounted on said platform.

3. The combination of claim 1 further comprising:
a plurality of auxiliary branch pipes each connected to the main pipe in proximity to a corresponding branch pipe and located beneath the corresponding branch pipe; and a plurality of second nozzles on each auxiliary branch pipe, each second nozzle being directed obliquely downwardly, in a direction away from said main pipe.

4. The combination of claim 3 wherein:
each branch pipe comprises at least three parallel segments all lying in the same horizontal plane and all being adapted to extend substantially from the front side of a compartment to the rear side; and
each auxiliary branch pipe comprises a segment which extends transversely with respect to the segments of the branch pipes;
said second nozzles being mounted on the transverse segments of the auxiliary branch pipes.

5. Apparatus for cleaning animal cages of the type comprising a plurality of animal compartments arranged successively in a vertical direction, each compartment having an access opening in a front portion thereof and a drainage opening in a rear portion thereof, said apparatus comprising:
a vertical main pipe for transmitting cleaning fluid;
a plurality of branch pipes each connected to the main pipe;
each branch pipe comprising a plurality of parallel first segments each of which includes a plurality of first nozzles for directing cleaning fluid in a downward direction;
a plurality of auxiliary branch pipes each of which is located immediately beneath a corresponding branch pipe;
each of said auxiliary branch pipes having a second segment which is transverse to the first segments of the branch pipes;
each of said branch pipes and its corresponding auxiliary branch pipe being of a height suitable for insertion into one of the access openings of a compartment of an animal cage;
all of the branch pipes being joined to the main pipe for simultaneous insertion into all of the compartments of one animal cage;
a plurality of nozzles on each second segment of each auxiliary branch pipe for directing cleaning fluid downwardly and rearwardly toward the drainage opening of the compartment into which it is adapted to extend;
a source of cleaning fluid;
and flexible transmitting means for transmitting cleaning fluid from the source to the main pipe.

References Cited by the Examiner
UNITED STATES PATENTS

| | | | |
|---|---|---|---|
| 2,558,628 | 6/51 | Redin | 134—95 |
| 2,648,342 | 8/53 | Vani et al. | 134—100 |
| 2,740,414 | 4/56 | Moskow | 134—100 |
| 2,752,925 | 7/56 | Friers | 239—159 |
| 3,010,461 | 11/61 | Faust et al. | 134—199 |

SAMUEL KOREN, *Primary Examiner.*
ALDRICH F. MEDBERY, *Examiner.*